United States Patent
Wang et al.

(10) Patent No.: US 7,068,866 B2
(45) Date of Patent: Jun. 27, 2006

(54) SLOW WAVE OPTICAL WAVEGUIDE FOR VELOCITY MATCHED SEMICONDUCTOR MODULATORS

(75) Inventors: Wenshen Wang, Torrence, CA (US); David C Scott, Lakewood, CA (US); Elizabeth T Kunkee, Manhattan Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 112 days.

(21) Appl. No.: 10/700,245

(22) Filed: Nov. 3, 2003

(65) Prior Publication Data

US 2005/0094917 A1   May 5, 2005

(51) Int. Cl.
*G02F 1/295* (2006.01)
*G02B 6/34* (2006.01)
*G02B 6/10* (2006.01)

(52) U.S. Cl. .............................. 385/10; 385/8; 385/37; 385/129; 385/130; 385/131; 385/132

(58) Field of Classification Search ................ 385/1–4, 385/8–10, 14, 129–132
See application file for complete search history.

(56) References Cited

U.S. PATENT DOCUMENTS

| | | | |
|---|---|---|---|
| 3,393,954 A | | 7/1968 | Enderby et al. ................ 385/2 |
| 5,091,981 A | | 2/1992 | Cunningham |
| 5,339,369 A | * | 8/1994 | Hopfer et al. ................. 385/2 |
| 5,367,177 A | * | 11/1994 | Taylor et al. .................. 257/20 |
| 5,619,607 A | * | 4/1997 | Djupsjobacka .............. 385/129 |
| 6,288,823 B1 | * | 9/2001 | Taylor ........................ 359/251 |
| 6,436,613 B1 | * | 8/2002 | Fallahi et al. ................ 430/321 |
| 6,529,646 B1 | | 3/2003 | Wight et al. ................... 385/1 |
| 6,545,791 B1 | | 4/2003 | McCaughan et al. ....... 385/245 |
| 6,563,631 B1 | * | 5/2003 | Delprat et al. .............. 359/344 |
| 6,600,843 B1 | | 7/2003 | Sriram et al. |
| 6,600,844 B1 | * | 7/2003 | Ionov ............................ 385/9 |

(Continued)

OTHER PUBLICATIONS

Shaw et al., "Optical slow-wave resonant modulation in electro-optic GaAs/AlGaAs modulators", Electronic Letters, IEE Stevenage, vol. 35, No. 18, Sep. 2, 1999, United Kingdom.

Soljacic et al., "Photonic-crystal slow-light enhancement of nonlinear phase sensitivity", Journal of the Optical Society of America, vol. 19, No. 9, Sep. 2002, USA.

(Continued)

*Primary Examiner*—Brian Healy
*Assistant Examiner*—Charlie Peng
(74) *Attorney, Agent, or Firm*—Carmen B. Patti & Assoc., LLC

(57) ABSTRACT

A PIN electro-optical traveling wave modulator (10) including diffraction gratings (34, 36) positioned at opposing sides of an optical waveguide (20) that act to change the propagation pattern of the waveguide (20). The modulator (10) includes an N-type layer (14), a P-type layer (18) and an intrinsic layer (16) acting as the waveguide (20). A metal electrode (26) is in electrical contact with the N-type layer (14), and a metal electrode (30) is in electrical contact with the P-type layer (18). The electrodes (26, 30) define an RF transmission line. An optical wave (22) propagates along the waveguide (20) and interacts with the gratings (34, 36) which slow the optical wave (22) to match its speed to the speed of the RF wave in the transmission line. In one embodiment, the gratings (34, 36) are 2-D gratings formed by vertical holes (38) in the waveguide (20).

20 Claims, 1 Drawing Sheet

U.S. PATENT DOCUMENTS

| | | | |
|---|---|---|---|
| 6,795,622 B1 * | 9/2004 | Forrest et al. | 385/50 |
| 6,822,982 B1 * | 11/2004 | Yoshida et al. | 372/20 |
| 6,870,624 B1 * | 3/2005 | Hobbs et al. | 356/416 |
| 6,900,920 B1 * | 5/2005 | Chang-Hasnain et al. | 359/244 |
| 2003/0214364 A1 * | 11/2003 | Cites et al. | 333/33 |
| 2005/0014300 A1 * | 1/2005 | Welch et al. | 438/17 |

OTHER PUBLICATIONS

Wikipedia, "Optical Cavity", http://en.wikipedia.org/wiki/Optical_cavity, helpdesk-1@wikimedia.org, pp. 3, Dec. 12, 2005, US.

Wikipedia, "Laser", http://en.wikipedia.org/wiki/Laser, helpdesk-1@wikimedia.org, pp. 9, Dec. 12, 2005, US.

* cited by examiner

SLOW WAVE OPTICAL WAVEGUIDE FOR VELOCITY MATCHED SEMICONDUCTOR MODULATORS

BACKGROUND OF THE INVENTION

1. Field of the Invention

This invention relates generally to a semiconductor optical modulator and, more particularly, to a semiconductor traveling wave optical modulator that employs diffraction gratings adjacent to the waveguide to slow the optical wave to a speed that matches the speed of the electrical wave in the transmission line.

2. Discussion of the Related Art

Electro-optical (EO) modulation devices are known in the art that use an electrical signal to frequency modulate an optical signal to impress information on the optical signal. One class of modulation devices of this type include semiconductor quantum well modulators that employ PIN semiconductor device architectures where the optical wave propagates down a waveguide defined within the intrinsic layer in the device. An RF signal is applied to electrodes in contact with the P and N layers to provide the modulation voltage, where the electrodes define an RF transmission line.

Low modulation voltages (sub-volts) are important to the performance of electro-optical quantum well modulators of the type being discussed herein. Semiconductor quantum well modulators have the potential to achieve the low modulation voltages that are desirable for system applications. These modulators can reach very low operation voltages because of the epitaxial layer structure that allows the electrodes to be spaced close together so that a high electric field can be established with smaller applied voltages.

When the operating frequency of the modulator is high, a travelling wave configuration can be introduced. The travelling wave configuration removes the frequency response limitation due to the RC constant and the transient time in a lumped circuit modulator. However, the frequency response will depend on the electrode RF loss, and the velocity matching between the optical wave in the waveguide and the electrical wave propagating in the RF transmission line.

The propagation constant of the fundamental mode in an optical waveguide is determined by the wavelength of the light beam, the index of refraction of the semiconductor material, and the geometry of the waveguide. The index of refraction of the waveguide is fixed by the specific semiconductor material being used. The propagation constant of the driving RF wave depends on the circuit structure of the transmission line. In general, a characteristic impedance $Z_0$, propagation constant $\beta e$, and loss $\alpha$ of a transmission line can be expressed by:

$$Z_0 = \sqrt{\frac{L}{C}}, B_e = \Omega\sqrt{LC}, \text{ and } \alpha = \frac{R}{2Z_0},$$

where L, C and R are the equivalent inductor, capacitor and resistor per unit length, respectively, and $\Sigma$ is the frequency. The impedance of the transmission line is nearly fixed due to the need for matching to the driving circuit near $50\Sigma$. Thus, the ratio of L over C is fixed. The expression of loss coefficient assumes that the metal loss is the dominating loss mechanism, although the doped region in the PIN structure can introduce significant loss as well. Therefore, R is inversely proportional to the width W of the top electrode. On the other hand, the dominating capacitance is at the PIN junction, and is proportional to W. Lower RF loss requires a large W, which in turn leads to a large C. Since the ratio of L/C is fixed due to the impedance consideration, it leads to a large $\beta e$, or a slow RF wave in the transmission line compared to the optical wave propagating in the optical waveguide.

The slow wave nature of the RF signal in the transmission line can limit the frequency response of the modulator, and prevent longer device structures for lower modulation voltages. This represents a difficult design trade-off between the microwave loss, which requires a wide electrode, and velocity matching, which requires a narrow electrode. A design approach that can improve the velocity mismatch in a semiconductor PIN modulator is advantageous since high RF loss is in general not acceptable in any device structure.

Previous attempts in the art to correct for velocity mismatch in a semiconductor PIN modulator have almost exclusively been directed to changing the electrode design, which changes the speed of the RF wave to match that of the optical wave. However, this type of approach has design trade-offs, as discussed above, and has only been successful so far, to the best knowledge of the authors, in further slowing down the microwave speed without introducing additional loss.

Velocity matching has been pursued in various modulator materials and structures. In LiNbO3 modulators, the microwave travels slower than the optical wave. Electrode designs that can reduce the distributed capacitance and therefore speed-up the RF wave have been demonstrated and widely used in commercial VMTW modulators. In bulk semiconductor modulators, the RF wave generally travels faster than the optical wave. Slow wave RF electrodes have been proposed and demonstrated for improved velocity matching. In both cases, modifications to the RF transmission lines have been performed to realize the velocity match, since the RF transmission lines are easier to maneuver due to large dimensions and freedom of physical layout.

What is needed is design approach that provides velocity matching between the RF wave and the optical wave in a semiconductor optical modulator without affecting the RF loss. It is therefore an object of the present invention to provide a design approach that accomplishes this velocity matching.

SUMMARY OF THE INVENTION

In accordance with the teachings of the present invention, a PIN electro-optical traveling wave modulator is disclosed that employs optical waveguide structures that can slow the lightwave propagation speed along the direction of interaction. The vertical direction of the waveguide uses conventional refractive index confinement from the epitaxial material layers, while the lateral direction uses periodic structure to provide reflection feedback to the lightwave to allow a "zig-zag" propation manner. The modulator includes a metal electrode in electrical contact with an N-type layer, a metal electrode in electrical contact with a P-type layer, and an intrinsic layer acting as the waveguide. The electrodes define an RF transmission line. The optical wave interacts with the periodic structure which slows the optical wave to match its speed to the speed of the RF wave in the transmission line. In one embodiment, the periodic structures are 2-D gratings formed along other sides of the waveguide.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a PIN electro-optical traveling wave modulator is merely exemplary in nature and is in no way intended to limit the invention, or its applications or uses.

Figure 1:
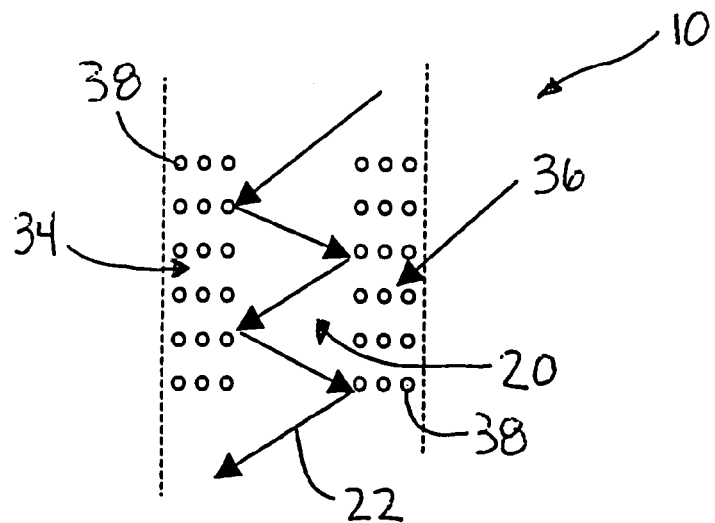
FIG. 1 is a top view of a PIN electro-optical traveling Wave modulator that employs diffraction gratings on opposing sides of the modulator waveguide, according to an embodiment of the present invention.
Figure 2:
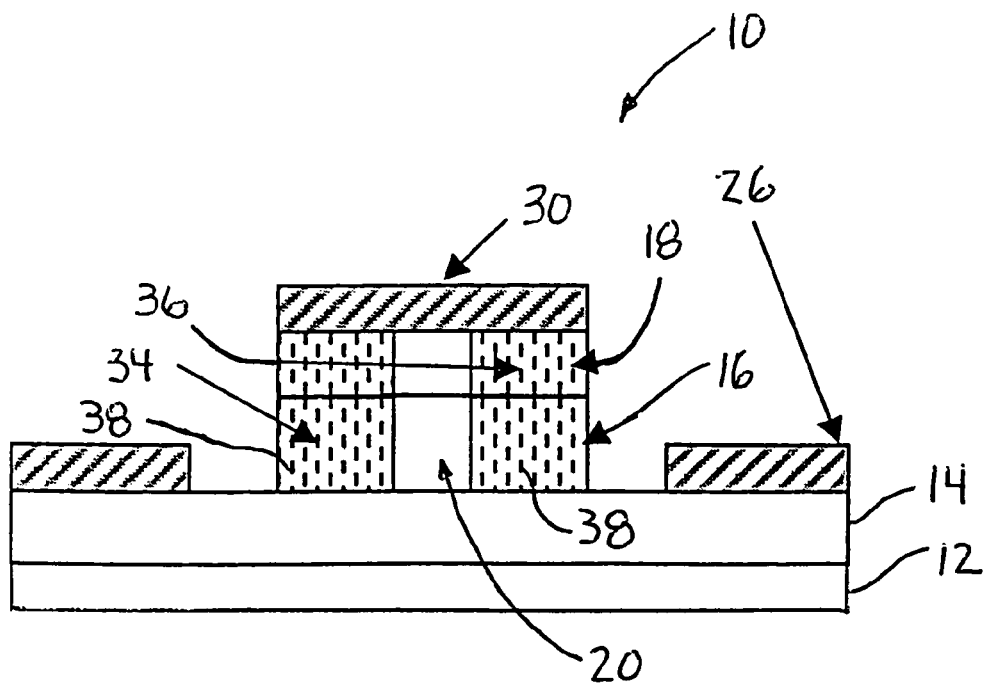
FIG. 2 is a cross-sectional view of the modulator shown in FIG. 1.

FIG. 1 is a top view and FIG. 2 is a cross-sectional view of a PIN electro-optical traveling wave modulator 10, according to an embodiment of the present invention. The modulator 10 includes a substrate 12 on which is deposited the various semiconductor device layers that make up the structure of the modulator 10. The semiconductor layers are deposited by a suitable epitaxial deposition process, as would be well understood to those skilled in the art. These semiconductor device layers include an N-type layer 14, an intrinsic layer 16 and a P-type layer 18 configured as shown. As is well known to those skilled in the art, the intrinsic layer 16 contains the device waveguide 20 where an optical wave 22 to be modulated propagates down the waveguide 20. The N-type layer 14, the intrinsic layer 16 and the P-type layer 18 can be any semiconductor material suitable for an optical modulator, such as InP.

The modulator 10 includes a metal electrode 26 in electrical contact with the N-type layer 14 and a top metal electrode 30 in electrical contact with the P-type layer 18. The electrodes 26 and 30 define an RF transmission line. An RF signal is applied to the electrodes 26 and 30 that creates an electrical field across the waveguide 20 that acts to modulate the optical wave 22, where the RF signal propagates down the transmission line. For the reasons discussed above, it is desirable to match the velocity of the optical wave 22 propagating down the waveguide 20 with the RF wave propagating down the RF transmission line.

According to the invention, Bragg diffraction gratings 34 and 36 are formed in opposing sides of the waveguide 20. In this embodiment, the gratings 34 and 36 are formed by air holes 38 etched in the grating region. However, in alternate embodiments, the holes 38 can be filled with a different material to provide higher index of refraction contrast between the grating region and the waveguide 20. In one embodiment, the gratings 34 and 36 are 2-D gratings defined by the holes 38 formed in a vertical direction in the waveguide 20 relative to the propagation direction of the optical wave 22, as shown. However, in alternate embodiments, the gratings 34 and 36 can be formed in other ways within the scope of the present invention. One such alternative embodiment would be the use of two-dimensional photonic band gap structure to provide lateral confinement. The width of the waveguide 20 and the width of the gratings 34 and 36 would be design specific and would be optimized for a particular wavelength and the like.

The confinement provided by the gratings 34 and 36 requires a minimum number of periods to provide enough of a reflection coefficient for the desired optical wave confinement. The actual number of the periods will depend on the index of refraction contrast in the grating region, which can be enhanced by using highly dispersive materials such as quantum dots, in addition to low index materials such as polyimide or even air for the grating structure.

The gratings 34 and 36 change the lateral confinement of the waveguide 20, and thus the modal field propagation pattern in the waveguide 20. The optical wave 22 interacts with the gratings 34 and 36 in a manner so that the propagation direction of the optical wave 22 is redirected in a "zig-zag" manner, as shown. This interaction reduces the effective forward phase velocity of the optical wave 22. In other words, the effective length of the propagation distance of the optical wave 22 will be increased based on the propagating mode's direction, which can be controlled by the aspect ratio of the gratings 34 and 36.

The mode propagation pattern of the optical wave 22 can effectively decrease the phase velocity in the propagation direction of the light of the optical wave 22 confined in the waveguide 20. This is well suited for RF signal propagating in the transmission line. A wider top electrode 30 is desired to reduce the RF propagation loss, but introduces large capacitance. Since a constant characteristic impedance, which is proportional to the square root of the inductance/capacitance ratio, is desired to match the driving circuits, a larger inductance needs to be introduced. The increase in both capacitance and inductance will lead to a reduced phase velocity, which is proportional to the square root of the product of inductance and capacitance.

Because the zig-zag optical path and the wider low loss RF transmission lines will slow the optical wave 22 and the RF wave, respectively, and the actual speeds are independently adjustable, the velocity match can be naturally realized using the proposed modulator structure. Additional benefits of a very long effective interaction length and lower RF propagation loss can also be possible. These characteristics are of critical importance to wide bandwidth and ultra-low modulation voltages.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A semiconductor modulator for modulating an optical wave with an RF signal, said modulator comprising:
    a substrate;
    an N-type layer deposited on the substrate;
    a semiconductor intrinsic layer deposited on the substrate and in contact with the N-type layer, said intrinsic layer containing an optical waveguide, said i trinsic layer including first and second diffraction gratings positioned at opposing sides of the intrinsic layer;
    a P-type layer deposited on the substrate and in contact with the intrinsic layer, and
    a first electrode in electrical contact with the N-type layer and a second electrode in electrical contact with the P-type layer, said first and second electrodes receiving the RF signal and said first and second diffraction gratings slowing the optical wave to match its speed to the speed of the RE signal in the electrodes.

2. The modulator according to claim 1 wherein the first and second diffraction gratings are formed by a material different than the material of intrinsic layer.

3. The modulator according to claim 2 wherein the material different than the intrinsic layer is Quantum Dots.

4. The modulator according to claim 1 wherein the first and second electrodes define a transmission line for the RF signal;
wherein the first and second diffraction gratings slow the optical wave propagating through the optical waveguide to match the speed of the RF signal propagating through the transmission line.

5. The modulator according to claim 1 wherein the first and second diffraction gratings force the optical wave to propagate trough the optical waveguide in a zig-zag manner to math the speed of the optical wave through the waveguide to the speed of the RF signal through the electrodes.

6. The modulator according to claim 1 wherein the first and second diffraction gratings serve to increase an effective propagation distance that the optical wave travels from an input of the waveguide to an output of the waveguide.

7. The modulator according to claim 1 wherein the first and second diffraction gratings serve to reduce an effective forward phase velocity of the optical wave.

8. The modulator according to claim 1 wherein the first and second electrodes define a transmission line for the RF signal, wherein one or more characteristics of the transmission line control the speed of the RF signal through the transmission line;
wherein an aspect ratio of the first and second diffraction gratings controls the speed of the optical wave through the waveguide;
wherein the aspect ratio of the first and second diffraction gratings and the one or more characteristics of the transmission line are independently adjustable to match the speed of the optical wave to the speed of the RF signal.

9. A semiconductor modulator for modulating an optical wave with an RF signal, said modulator comprising:
a substrate;
an N-type layer deposited on the substrate;
a semiconductor intrinsic layer deposited on the substrate and in contact with the N-type layer, said intrinsic layer, including first and second diffraction gratings positioned at opposing sides of the intrinsic layer, said first and second diffraction gratings including etched holes in the intrinsic layer that extend in a direction perpendicular to the propagation direction of the optical wave;
a P-type layer deposited on the substrate and in contact with the intrinsic layer; and
a first electrode in electrical contact with the N-type layer and a second electrode in electrical contact with the P-type layer, said first and second electrodes receiving the RF signal and said first and second diffraction gratings slowing the optical wave to match its speed to the speed of the RF signal in the electrodes.

10. A semiconductor modulator for modulating an optical wave with an RF signal, said modulator comprising:
a substrate;
an N-type layer deposited on the substrate;
a semiconductor intrinsic layer deposited on the substrate and in contact with the N-type layer, said intrinsic layer containing an optical waveguide, said intrinsic layer including first and second Bragg diffraction gratings positioned at opposing sides of the intrinsic layer;
a P-type layer deposited on the substrate and in contact with intrinsic layer; and
a first electrode in electrical contact wit the N-type layer and a second electrode in electrical contact with the P-type layer, said first and second electrodes receiving the RF signal and said first and second diffraction gratings slowing the optical wave to match its speed to the speed of the RF signal in the electrodes.

11. A semiconductor modulator for modulating an optical wave with an RF signal, said modulator comprising:
a substrate;
an N-type layer deposited on the substrate;
a semiconductor intrinsic layer deposited on the substrate and in contact with the N-type layer, said intrinsic layer containing an optical waveguide, said intrinsic layer including first and second two-dimensional diffraction gratings positioned at opposing sides of the intrinsic layer;
a P-type layer deposited on the substrate and in contact with the intrinsic layer; and
a first electrode in electrical contact with the N-type layer and a second electrode in electrical contact with the N-type layer, said first and second electrodes receiving to RF signal and said first and second diffraction gratings slowing the optical wave to match its speed to the speed of the RF signal in the electrodes.

12. A semiconductor modulator for modulating an optical wave with an RF signal, said modulator comprising:
a substrate;
an N-type InP layer deposited on the substrate;
a semiconductor intrinsic InP layer deposited on the substrate and in contact with the N-type InP layer, said intrinsic InP layer containing an optical waveguide, said intrinsic InP layer including first and second diffraction gratings positioned at opposing sides of the intrinsic InP layer;
a P-type InP layer deposited on the substrate and in contact with the intrinsic InP layer; and
a first electrode in electrical contact with the N-type InP layer and a second electrode in electrical contact with the P-type InP layer, said first and second electrodes receiving the RF signal and said first and second diffraction gratings slowing the optical wave to match its speed to the speed of the RF signal in the electrodes.

13. A traveling wave semiconductor optical modulator for modulating an optical signal with an RF signal, said modulator comprising:
a substrate;
an N-type layer deposited on the substrate;
a semiconductor intrinsic layer deposited on the substrata and in contact with the N-type layer, said intrinsic layer containing an optical waveguide, said intrinsic layer including two-dimensional Bragg diffraction gratings positioned at opposing sides of the waveguide, said diffraction gratings causing the optical signal to propagate down the waveguide in a zig-zag manner so as to increase its propagation length through the waveguide, said first and second diffraction gratings including etched holes that extend in a perpendicular direction to the propagation direction of the optical signal;
a P-type layer deposited on the substrate and in contact with the intrinsic layer; and
a first electrode in electrical contact with the N-type layer and a second electrode in electrical contact with the P-type layer, said first and second electrodes defining a transmission line, said first and second electrodes receiving the RF signal, wherein the first and second diffraction gratings cause the optical signal to have a speed that matches the speed of the RF signal in the transmission line.

14. The modulator according to claim 13 wherein the first and second diffraction gratings are formed by a material different than the material of the intrinsic layer.

15. The modulator according to claim 14 wherein the material different than the intrinsic layer is Quantum dots.

16. The modulator according to claim 13 wherein the first and second diffraction gratings are two-dimensional gratings.

17. A method of modulating an optical signal with an RF signal, said method comprising the steps of:
providing a PIN semiconductor modulator structure, said step of providing the modulator structure including forming first and second Bragg diffraction gratings in an intrinsic layer of the structure where the intrinsic layer contains an optical waveguide, said step further including forming holes in the intrinsic layer that extend in a direction perpendicular to the propagation direction of the optical signal;
propagating the optical signal down the waveguide so that it interacts with the first and second diffraction gratings to cause the optical signal to propagate in a zig-zag manner; and
applying an electric field across the waveguide to modulate the optical signal, where the speed of the electric field along the waveguide is matched to the speed of the optical signal.

18. The method according to claim 17 wherein the step of forming the first and second diffraction gratings include forming the first and second diffraction gratings from a photonic bandgap material.

19. The method according to claim 17 wherein the step of forming the first and second Bragg diffraction gratings in the intrinsic layer of the structure comprises the step of:
setting a periodicity of the first and second Bragg diffraction gratings to a level that matches the speed of the optical signal to the speed of the electric field.

20. The method according to claim 17 wherein the RF signal propagates down a transmission line, wherein one or more characteristics of the transmission line control the speed of the electric field, wherein an aspect ratio of the first and second diffraction gratings controls the speed of the optical wave through the waveguide, the method further comprising the step of:
adjusting the aspect ratio of the first and second diffraction gratings and/or one or more of the one or more characteristics of the transmission line to match the speed of the optical wave to speed of the electric field.

* * * * *